United States Patent

Schmidt

Patent Number: 5,160,150
Date of Patent: Nov. 3, 1992

[54] CHUCK

[76] Inventor: Claus Schmidt, Wilhelmshof-Strasse 34, D-7120 Bietigheim-Bissingen, Fed. Rep. of Germany

[21] Appl. No.: 614,163

[22] Filed: Nov. 9, 1990

[30] Foreign Application Priority Data

Nov. 11, 1989 [DE] Fed. Rep. of Germany ....... 3937570

[51] Int. Cl.⁵ .............................................. B23B 31/20
[52] U.S. Cl. ...................................... 279/58; 279/901; 279/46.7; 279/54; 279/51
[58] Field of Search ....................... 279/58, 57, 54, 66, 279/76, 1 M, 1 ME, 1 Q, 60, 65, 93, 51, 59; 409/239 R, 239 A, 232, 233

[56] References Cited

U.S. PATENT DOCUMENTS

| 894,387 | 7/1908 | Lester | 279/51 |
| 1,403,415 | 1/1922 | Iggberg | 279/58 |
| 2,619,357 | 11/1952 | Montgomery | 279/60 |
| 2,746,758 | 5/1956 | Stoner et al. | 279/1 Q |
| 4,214,766 | 7/1980 | Rall et al. | 279/901 X |
| 4,856,797 | 8/1989 | Rall | 279/51 X |
| 4,858,938 | 8/1989 | Terwilliger et al. | 279/901 X |

FOREIGN PATENT DOCUMENTS

| 0258771 | 3/1988 | European Pat. Off. . |
| 829397 | 1/1952 | Fed. Rep. of Germany . |
| 2831140 | 1/1980 | Fed. Rep. of Germany . |
| 3629722 | 3/1988 | Fed. Rep. of Germany . |

OTHER PUBLICATIONS

Frick, H., Lamellenspannzeuge, IN: Werkstatt und Betrieb; Feb. 1969, pp. 89-90.

Primary Examiner—Larry I. Schwartz
Assistant Examiner—Robert Schultz
Attorney, Agent, or Firm—Robert W. Becker & Associates

[57] ABSTRACT

A chuck for a machine tool is provided and includes a chuck body that is provided with a frusto-conical opening that has guide surfaces. A clamping head is adapted to be received in the opening of the chuck body, with the clamping head having an axially extending receiving opening for workpieces, cooperating with a drawing mechanism, and being provided with gripping jaws that have mating guide surfaces. The guide surfaces of the opening of the chuck body have a pressure connection with the mating guide surfaces of the gripping jaws. The clamping head is provided with radially oriented receiving opening for the gripping jaws, which are radially movable in the receiving openings. The gripping jaws each have a width that is less than an inner radius of the opening of the chuck body.

9 Claims, 4 Drawing Sheets

CHUCK

BACKGROUND OF THE INVENTION

The present invention relates to a chuck for a machine tool or shop machine and includes a chuck body that is provided with a frusto-conical opening that has guide surfaces, whereby a clamping or chuck head or member is adapted to be received in the opening of the chuck body, with the clamping head having an axially extending receiving opening for workpieces, cooperating with a drawing mechanism, and being provided with gripping jaws that have cooperating or mating guide surfaces, whereby the guide surfaces of the frusto-conical opening of the chuck body have a pressure connection with the mating guide surfaces of the gripping jaws.

A chuck of the aforementioned general type is disclosed, for example, in EP 0 258 771. In heretofore known chucks, the gripping jaws have the shape of a portion of a truncated cone surface and are interconnected by elastomeric spring elements. A complete pressure connection between the gripping jaws and the guide surface is possible in only a single position of the gripping jaws relative to the chuck body, since when the gripping jaws are axially displaced, those portions of the gripping jaws and guide surfaces that correspond with one another have different guide radii. In addition, when the clamping head is introduced into the chuck body, the spacing between the gripping jaws is also reduced, which can lead to a further imprecision of the concentricity o ability of the workpiece to run true.

Proceeding from the aforementioned state of the art, it is an object of the present invention to improve a chuck of the aforementioned general type in such a way that a trueness can be maintained with a precision of less than $10^{-2}$ mm.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
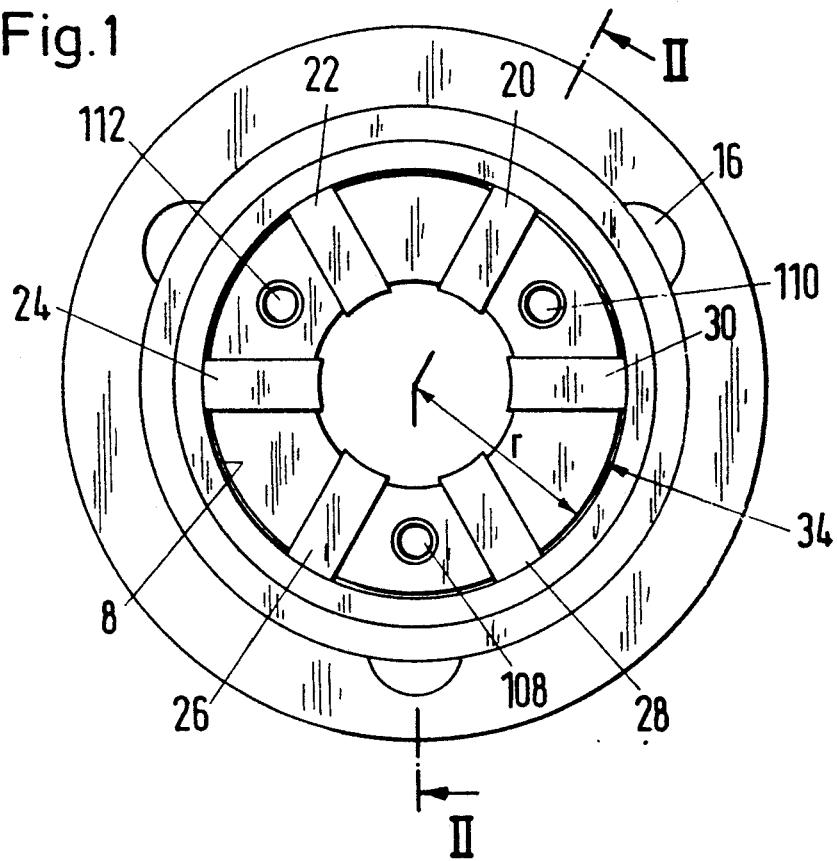
FIG. 1 is an end view of one exemplary embodiment of the inventive chuck.

The chuck of the present invention is characterized primarily in that the clamping head is further provided with radially oriented receiving means for the gripping jaws, which are radially movable in the receiving means, and in that each of the gripping jaws has a width that is less than an inner radius of the frusto-conical opening of the chuck body.

The inventive clamping head comprises a cage-like base member in which are formed the receiving means for the gripping jaws. With respect to the base member, the gripping jaws execute only radial movements. The preoision with which the trueness can be established depends upon the width of the gripping jaws, with this width being measured in the circumferential direction of the essentially frusto-conical clamping head. The less the width of the gripping jaws relative to the radius of the opening, the greater can be the axial movements that the gripping jaws execute and during which they are in connection with the guide surface over essentially the entire surface thereof. Since the forces that act upon the mating guide surfaces via the drawing mechanism can be considerable, if the width of the gripping jaws is reduced, the number of gripping jaws is expediently increased, so that the sum of the mating guide surfaces remains nearly constant. With this recognition, it is possible to achieve a trueness of a workpiece with a precision of $10^{-3}$ mm.

If the gripping jaws of the chuck have convex mating guide surfaces, it is expedient for the radius of curvature of the mating guide surfaces to correspond approximately to the radius of curvature of the guide surfaces of the frusto-conical opening. In this connection, it is expedient for the radial cross-sectional configuration of the gripping jaws to be nearly rectangular. Since the envelope of the guide surface forms a truncated cone, the diameter of which decreases inwardly, the radius of curvature also increases, so that it is expedient for the mating guide surfaces to have an approximately trapezoidal configuration when viewed in plan. The precision with which the trueness of a workpiece can be established is therefore a function of the radius of curvature of the guide surface of the relative width of the clamping jaws relative to the radius of the opening, of the axial length of the opening, and of the number of gripping jaws.

Pursuant to a further expedient specific embodiment of the present invention, the receiving means are provided with widened portions that extend around the gripping jaws and that are filled with resiliently deformable holding means that connect the gripping jaws with the clamping head. The widened portions are filled with rubber or a resilient plastic, with the holding means trying to move the gripping jaws radially outwardly. In the removed state of the clamping head, the mating guide surfaces of the gripping jaws project out of the clamping head. In so doing, the workpiece that is disposed in the clamping head is released, so that no fixed connection exists between the gripping jaws and the workpiece.

Pursuant to a further expedient specific embodiment, the receiving means can be open toward the outer surface of the clamping head, and the gripping jaws can be connectable with the clamping head via coupling elements. As a further development of this concept, it is particularly expedient if the coupling elements are formed by radially directed projections of the gripping jaws and by recesses of the clamping head in which the projections engage. The gripping jaws thus cooperate indirectly with the drawing mechanism, since the gripping jaws are taken along upon operation of the clamping head and are introduced into the chuck body. In so doing, there is exerted upon the gripping jaws a force that is several times greater than the force which acts in the drawing mechanism and that effects a securement of the workpiece between the gripping jaws. In order to be able to easily connect and detach the clamping head with the drawing mechanism, it is proposed pursuant to a further expedient specific embodiment of the present invention that the clamping head be detachably connectable with the drawing mechanism via a bayonet closure. In this connection, it is advantageous if the clamping head is provided with radially outwardly directed bayonet closure projections that are disposed on the periphery and that cooperate with radially inwardly directed bayonet closure projections of the drawing mechanism. To ensure that the bayonet closure connection that is established cannot loosen itself during operation, it is furthermore expedient for the clamping head to be provided with a radially outwardly open recess that in the operational state of the clamping head is engaged by a spring-loaded locking bolt of the chuck body. In order to be able to release this locking connection, it is furthermore proposed that the clamping head be provided with an axial bore that opens into the recess and is also open to the end face of the clamping head; a further bolt of a release mechanism can be inserted into this bore, with this further bolt cooperating with the locking bolt and being able to move the same out of the recess.

These measures can also be met by having the further bolt cooperate with a return spring that tries to remove this bolt from the recess. To improve the operation with the release mechanism, and to be able to easily remove the clamping head from the chuck body, it is proposed pursuant to a further expedient specific embodiment of the present invention that the release mechanism have at least two, and preferably three, pins that extend approximately parallel to the further bolt and that the clamping head have bores for the pins. In this connection, it is advantageous if that end face of the release mechanism that faces the clamping head is provided with magnetic members.

Pursuant to another specific embodiment of the present invention, the gripping jaws can be in the form of nearly parallelepipedal blocks that terminate in coupling elements.

Further specific features of the present invention will be described in detail subsequently.

DESCRIPTION OF PREFERRED EMBODIMENTS

Figure 2:
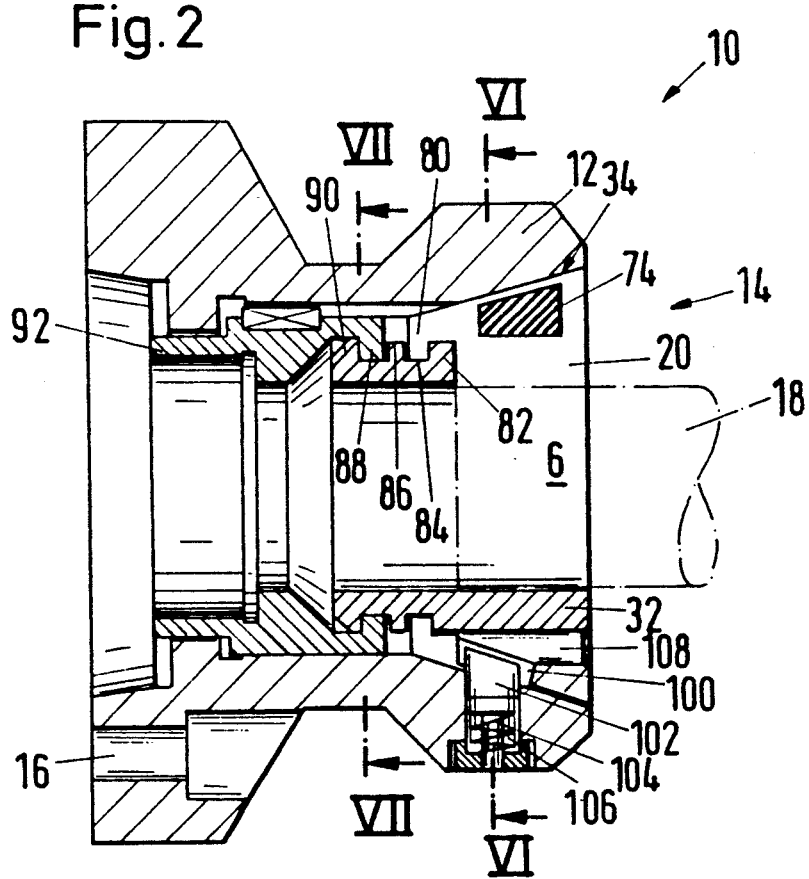
FIG. 2 is a cross-sectional view taken along the line II—II in FIG. 1.
Figure 6:
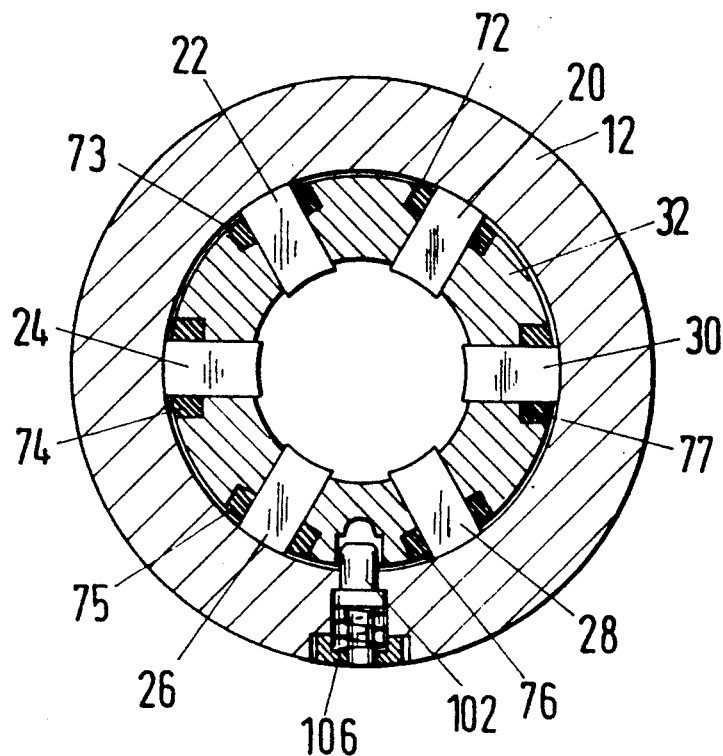
FIG. 6 is a cross-sectional view taken along the line VI—VI in FIG. 2.

Referring now to the drawings in detail, FIGS. 1 and 2 show a chuck 10 for a machine tool or shop machine, with the chuck including a chuck body 12 that is provided with a frusto-conical opening 8 a guide surfaces 34. A clamping or chuck head or member 14 is adapted to be received in the opening 8 of the chuck body 12. The clamping head 14 has an axially extending receiving opening 6 for workpieces 18, cooperates with a drawing mechanism 92, and is provided with gripping jaws 20-30 that have cooperating or mating guide surfaces 36 to 46, whereby the guide surfaces 34 of the frusto-conical opening 8 of the chuck body 12 have a pressure connection with the mating guide surfaces 36-46 of the gripping jaws 20-30. The clamping head 14 is provided with radially oriented receiving means 62 to 71 (see FIG. 3) for the radially movable gripping jaws 20 to 30. The width of the gripping jaws 20-30 is in this connection less than the inner radius "r" of the opening 8 (see FIG. 1). In the operational state see FIG. 2), the clamping head 14 is flush with the chuck body 12, and the workpiece 18 is held securely in pl(R)ce by the gripping jaws 20 to 30. As can further be seen from FIGS. 1 and 3, the radial cross-sectional configuration of the gripping jaws 20 to 30 is nearly rectangular. Merely the mating guide surfaces 36 to 46, as well as the gripping surfaces 50 to 60, which are in pressure connection with the workpiece 18, have a convex or concave configuration. The receiving means 62 to 71 are provided with widened portions 72–77 (see also FIG. 6) that extend around the gripping jaws 20 to 30 and are filled with resiliently deformable holding means that connect the gripping jaws 20 to 30 with the clamping head 14. The widened portions 72–77 are filled with rubber or plastic and are embodied in suoh a way that in the non-operational state of the clamping head 14 (FIG. 3) they displace the gripping jaws 20 to 30 radially outwardly. The mating guide surfaces 36 to 46 therefore project beyond the radial outer wall of the clamping head 14. Furthermore, as can be seen from FIGS. 2 and 3, the receiving means 62 to 71 are open toward the outer side of the clamping head 14, and the gripping jaws 20 to 30 can be connected to the clamping head 40 via coupling elements 80.

The coupling means or coupling elements 80, 82, 84, 86 comprise radially directed projections 80 of the gripping jaws 20 to 30, and a recess 84, in the illustrated embodiment an annular groove, that is defined by two annular flanges 86 and 82 and into which the projections 80 engage. Thus, the clamping head 14 comprises a base member 32 having radially oriented receiving means 84 in which are inserted the separate gripping jaws, which via their projections 80 engage in the annular groove 84 and are fixed via holding means. When the clamping head 14 is actuated via the drawing mechanism 92, the gripping jaws 20 to 30 are moved in the axial direction of the workpiece 18. In so doing, the gripping jaws cooperate with the guide surfaces 34, as a result of which the gripping jaws are moved radially inwardly toward the workpiece 18 until an appropriate pressure is exerted upon the workpiece. Since the width of the mating guide surfaces 36 to 46 is small relative to the radius of the opening 8, a connection between the guide surface 34 and the mating guide surfaces 36 to 46 that essentially extends over the entire surface thereof is ensured. The guide surface 34 slopes toward the longitudinal central axis of the workpiece 18 at an angle of about 15°. If an even smaller width for the mating guide surfaces 36 to 46 relative to the inner radius of the opening 8 is selected, an even greater precision is achieved when the workpiece 18 is inserted. The drawing mechanism 92 exerts considerable forces upon the clamping head 14, and in so doing in particular upon the gripping jaws, so that if the mating guide surfaces have a lesser width, it is expedient to increase the number of gripping jaws. In the illustrated embodiment, six gripping jaws are provided. However, it is possible to increase the number of gripping jaws to 8, 12, or even 24. If 24 gripping jaws are provided, a precision of the trueness of $10^{-3}$ mm can be achieved.

Figure 3:
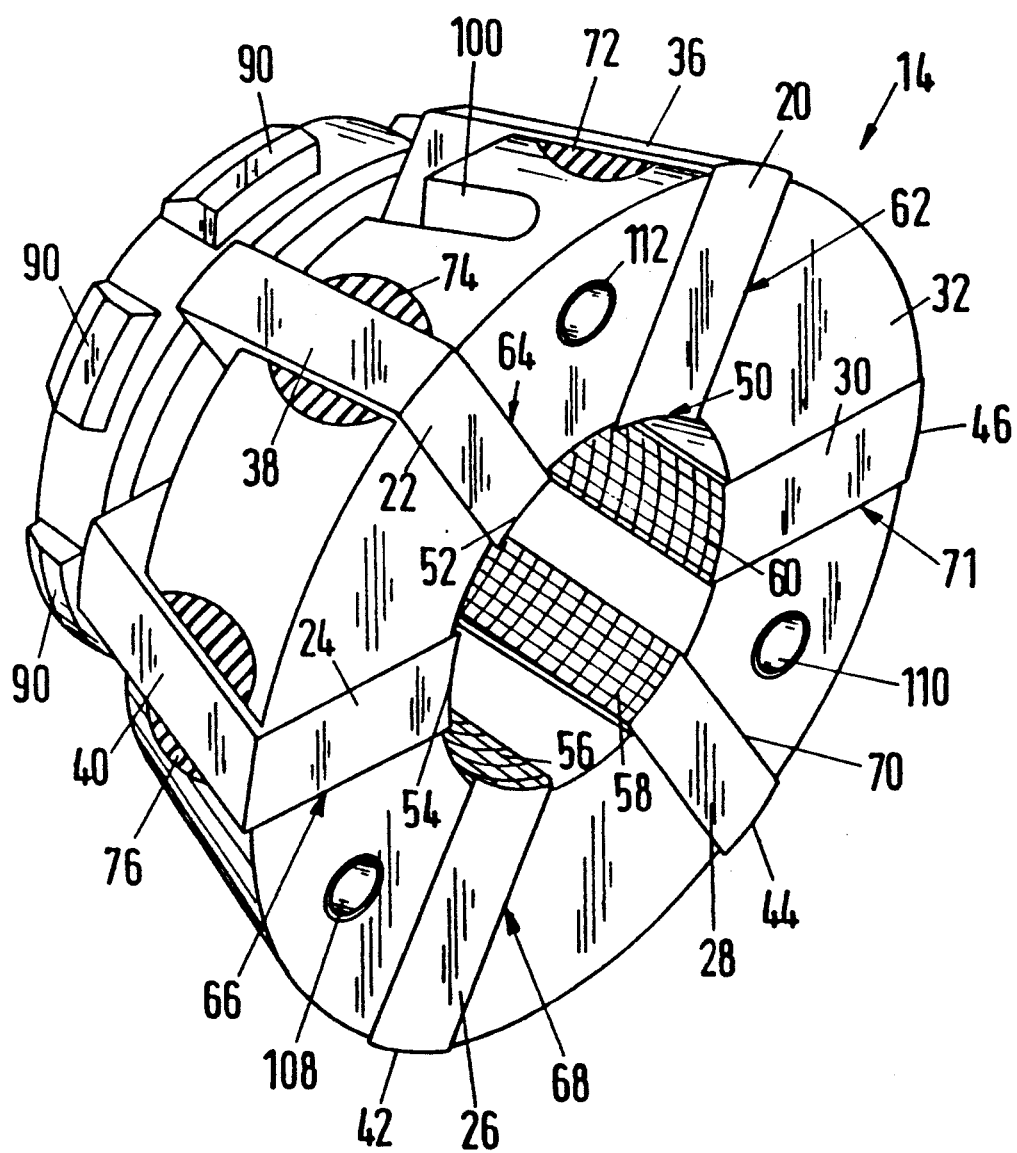
FIG. 3 is a perspective side view of one exemplary embodiment of a clamping head for the chuck of FIG. 1.
Figure 4:
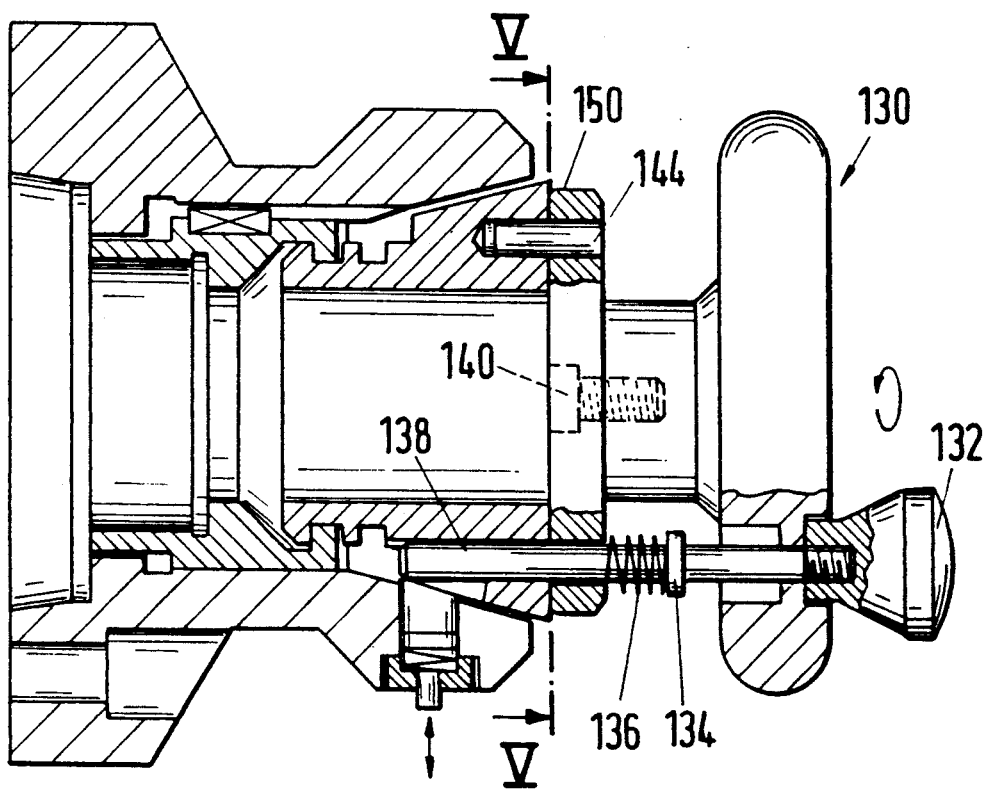
FIG. 4 shows the chuck of FIG. 2 provided with a release mechanism.
Figure 5:
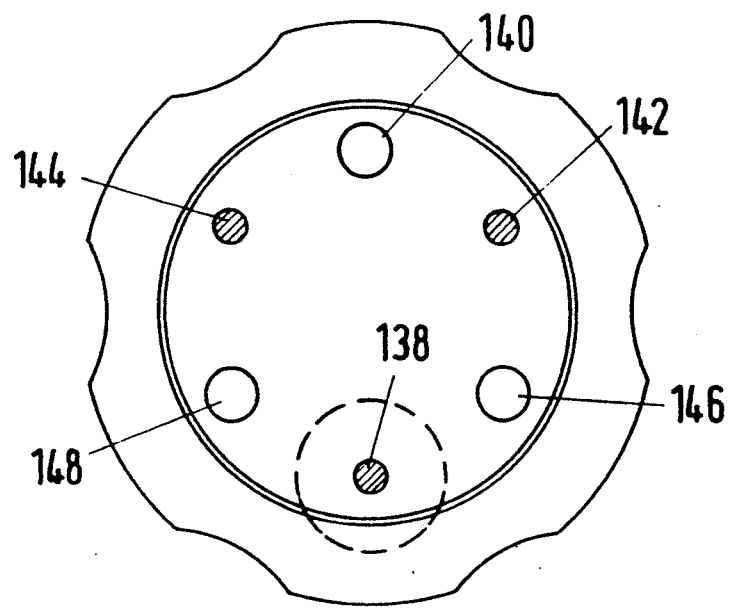
FIG. 5 is a cross-sectional view taken along the line V—V in FIG. 4.
Figure 7:
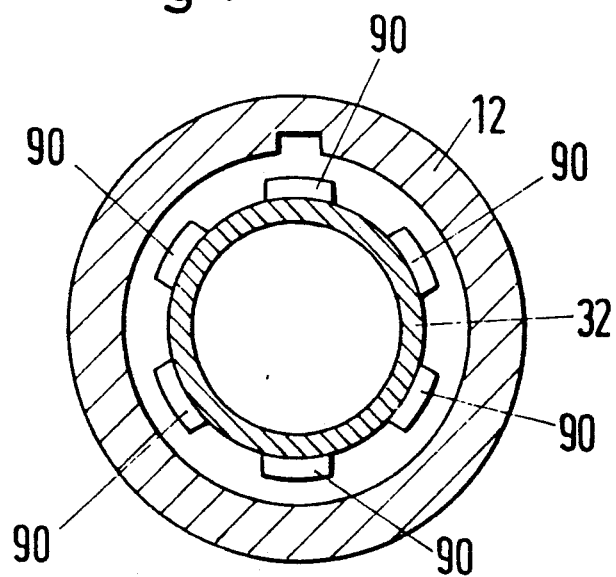
FIG. 7 is a cross-sectional view taken along the line VII—VII in FIG. 2.

FIGS. 2 and 3 further show that the clamping head 14 can be detachably connected with the drawing mechanism 92 via a bayonet closure. To acoomplish this the clamping head 14 is provided with radially outwardly directed bayonet closure projections 90 that are disposed on the periphery (see FIGS. 2, 3, and 7) and that cooperate with radially inwardly directed bayonet closure projections 88 of the drawing mechanism 92. Thus, the outer side of the clamping head 14 is provided with two annular grooves between which the annular projection or flange 86 is formed. The projections of the gripping jaws 20 to 30 extend into one of the annular grooves, while the bayonet closure projections 88 extend into the other annular groove. When the clamping head 14 is introduced into the chuck body 12, the bayonet closure projections 88 enter between the bayonet closure projections 90 (see FIG. 3), and the clamping head 14 is turned slightly until the bayonet closure projections 90 engage behind the bayonet closure projections 88 in a form-locking manner that is, the bayonet closure projections 90 and as interlock in a tight fit due to their corresponding mating form (see FIG. 2). In order to maintain this connection during operation, the clamping head 14 is provided with a radially outwardly open recess 100 into which extends a spring-loaded locking bolt 102 of the chuck body 12. The locking bolt 102 has a guide pin 104 as well as a compression spring 106 that urges and holds the bolt in the recess 100. In order to be able to remove the clamping head 14 from the chuck body 12, the clamping head 14 has an axially extending bore 108 that opens into the recess 100 and is furthermore open at the end face of the clamping head. As shown in FIG. 4, a bolt 138 of a release mechanism 130 can be inserted into the bore 108: the bolt 1S8 cooperates with the locking bolt 102 and can move the same out of the recess 100.

The bolt 138 cooperates with a return spring 136 that tries to draw the bolt 138 out of the recess 100. The release mechanism 130 has a total of two pins 142 and 144, which extend approximately parallel to the bolt 138, all of which can be introduced into recesses or bores 108, 110, and 112 of the clamping head 14. That end face of the release mechanism 130 that faces the clamping head 14 is provided with magnetic members 140, 146, and 148 that hold the clamping head 14.

The chuck is provided with a clamping head 14 as follows. A clamping head 14 (see FIG. 3) is selected that has a receiving opening 6 that is slightly larger than the diameter of the workpiece 18. This clamping head 14 is placed into the chuck body 12, with the bayonet closure projections 90 being introduced between the bayonet closure projections 88. In this position, the clamping head that is carried by the release mechanism 130 is rotated until the bayonet closure projections 90 extend behind the bayonet closure projections 88. In so doing, the locking means or bolt 102 also snaps into the locking recess 100, whereby the user is assured that the clamping head 14 has achieved the operating state. The end face of the clamping head projects slightly beyond the end face of the chuck body 12. In this position, the clamping head 14 is provided with the workpiece 18 and the drawing mechanism 92 is actuated, as a result of which the clamping head 14 is moved inwardly. In so doing, the guide surface 34 cooperates with the mating guide surfaces 36 to 46, as a result of which the gripping jaws 20 to 30 are moved radially inwardly and securely hold the workpiece 18 in position. When the operating position has been reached, the clamping head 14 is flush with the chuck body 12. The chuck 10 is provided with a number of holes 16 for non-illustrated bolts or screws via which the chuck 10 can be connected, for example, to a machine tool. If the clamping head 14 with the workpiece 18 is now to be removed from the chuck body 12, the release mechanism 130 is installed by inserting the pins 138, 142, 144 thereof into the bores 108, 110, and 112. The bolt 138 is thereupon moved inwardly. In so doing, the end face of the bolt 138 slides upon the incline of the locking bolt 102, as a result of which the bolt 102 is moved out of the recess 100. In this position of the bolt 138 (see FIG. 4), the clamping head 14 can be rotated about its axis so that the bayonet closure can be released. The clamping head 14 can thereupon be withdrawn from the chuck body 12 since on the one hand it is held by the magnets 140, 146, and 148, and on the other hand radial pressure forces act upon the guide surface 34, since the individual gripping jaws are prestressed by the holding means.

It should be noted that it would, of course, also be possible to form in the guide surfaces axially oriented grooves into which the mating guide surfaces of the gripping jaws would then be guided. If the walls of the grooves would be planar and would be positively connectable with the gripping jaws, it would then be possible to work with a considerable precision.

The present invention is, of course, in no way restricted to the specific disclosure of the specification and drawings, but also encompasses any modifications within the scope of the appended claims.

What I claim is:

1. In a chuck for a machine tool, comprising:

a chuck body that is provided with a frusto-conical opening that has a guide surface;

a clamping head that is adapted to be received in said opening of said chuck body and that has a base member with a plurality of circumferentially spaced and radially oriented receiving means, with said clamping head having an axially extending receiving opening for workpieces;

a drawing mechanism for axially reciprocating said clamping head;

said clamping head further comprising gripping jaws provided at said clamping head that have a tapered guide surface for engaging said frusto-conical guide surface and are disposed in a radiallly movable manner in said radially oriented receiving means of said base member of said clamping head, with each gripping jaw having a width that is less than an inner radius of said opening of said chuck body, whereby said jaw guide surfaces contact said guide surface of said opening of said chuck body in a pressure connection;

said receiving means of said base member being open toward an outer side of said clamping head;

coupling means being provided for connecting said gripping jaws with said base member;

a bayonet closure means for connecting said base member to said drawing mechanism, said bayonet closure means comprising a plurality of projections extending radially outward from said base member and that are circumferentially spaced from one another and are in a common plane that is normal to the longitudinal axis defined by said base member and a plurality of circumferentially spaced projections extending radially inwardly from said drawing mechanism, whereby said clamping head can be introduced into said chuck body opening and said base member inserted between said drawing mechanism projections and thereafter rotated to cause axial conflict between said projections of said base member and of said drawing mechanism to axially coupled the same; and a releasable locking means for securing said clamping head, in an operational state thereof, against rotation.

2. A chuck according to claim 1, wherein said releasable locking means is in the form of a recess provided at said clamping head, which recess is open radially outwardly and into which a spring-loaded locking bolt of said chuck body extends in said operational state.

3. A chuck according to claim 2, wherein, for releasing said locking means and subsequently rotating said clamping head relative to said chuck body, a release mechanism, having a bolt and at least one pin, is attachable to an open face of said base member.

4. A chuck according to claim 3, wherein said base member is provided with an axially extending bore that opens into said recess of said clamping head and is open toward an end face of said clamping head, whereby said bolt of said release mechanism is inserted into said bore for releasing said locking bolt.

5. A chuck according to claim 3, wherein bores for receiving said pins are provided at said open face of said base member facing said release mechanism.

6. A chuck according to claim 3, wherein an end face of said release mechanism that faces said clamping head is provided with magnetic members.

7. A chuck according to claim 1, wherein said receiving means are provided with widened portions that are filled with resiliently deformable holding means engaging said gripping jaws.

8. A chuck according to claim 1, wherein said coupling means comprise radially directed projections at said gripping jaws and a recess at said base member, whereby said projections engage said recess and thereby connecting said gripping jaws with said base member.

9. A chuck according to claim 1, wherein said busy member projections are engaging behind said drawing mechanism projections.

* * * * *